US010187536B2

(12) United States Patent
Nimura

(10) Patent No.: US 10,187,536 B2
(45) Date of Patent: Jan. 22, 2019

(54) METHOD, APPARATUS AND STORAGE MEDIUM FOR ESTIMATING THE DATA VOLUME OF A DIGITAL BOOK

(71) Applicant: CASIO COMPUTER CO., LTD., Shibuya-ku, Tokyo (JP)

(72) Inventor: Ryo Nimura, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 31 days.

(21) Appl. No.: 15/446,217

(22) Filed: Mar. 1, 2017

(65) Prior Publication Data
US 2017/0339293 A1 Nov. 23, 2017

(30) Foreign Application Priority Data

May 20, 2016 (JP) ................................. 2016-101769

(51) Int. Cl.
*H04N 1/00* (2006.01)
*G06K 9/20* (2006.01)
(Continued)

(52) U.S. Cl.
CPC ....... *H04N 1/00708* (2013.01); *G06K 9/2054* (2013.01); *G06T 7/0002* (2013.01); *H04N 1/0044* (2013.01); *H04N 1/00726* (2013.01); *H04N 1/00734* (2013.01); *H04N 1/38* (2013.01); *H04N 1/393* (2013.01); *H04N 1/60* (2013.01); *G06T 2207/10008* (2013.01)

(58) Field of Classification Search
CPC .. H04N 1/00708; H04N 1/044; H04N 1/0044; G06K 9/2054; G06T 7/0002
See application file for complete search history.

(56) References Cited

U.S. PATENT DOCUMENTS

| 9,019,572 B2 | 4/2015 | Hasegawa |
| 2009/0040569 A1* | 2/2009 | Hamzy ............... H04N 1/3873 358/488 |
| 2017/0111530 A1* | 4/2017 | Gopalakrishnan ......................... H04N 1/00708 |

FOREIGN PATENT DOCUMENTS

| JP | 05037747 A | 2/1993 |
| JP | 2001045247 A | 2/2001 |

(Continued)

OTHER PUBLICATIONS

Japanese Office Action dated Nov. 10, 2017 issued in counterpart Japanese Application No. 2016-101769.

*Primary Examiner* — Christopher D Wait
(74) *Attorney, Agent, or Firm* — Holtz, Holtz & Volek PC

(57) ABSTRACT

A processor randomly selects a page image group corresponding to a predetermined number of pages, such as five pages, from scan images of all the pages of a book, and clips a predetermined area (evaluation area) from each of the selected page images. Subsequently, the processor performs, on each clipped image, color correction and compression at a compression rate in accordance with an image quality specified via a user interface, and derives the data volume of each clipped image subjected to the processing. In addition, based on the data volumes of the clipped images subjected to the processing, the processor derives estimated one page data volumes. Then, by using the estimated one page data volumes, the processor derives an estimated data volume of a digital book corresponding to the total pages of the book.

14 Claims, 7 Drawing Sheets

(51) Int. Cl.
*G06T 7/00* (2017.01)
*H04N 1/393* (2006.01)
*H04N 1/60* (2006.01)
*H04N 1/38* (2006.01)

(56) References Cited

FOREIGN PATENT DOCUMENTS

| | | |
|---|---|---|
| JP | 2007243237 A | 9/2007 |
| JP | 2010109944 A | 5/2010 |
| JP | 2010200284 A | 9/2010 |
| JP | 2014140146 A | 7/2014 |

\* cited by examiner

METHOD, APPARATUS AND STORAGE MEDIUM FOR ESTIMATING THE DATA VOLUME OF A DIGITAL BOOK

CROSS-REFERENCE TO RELATED APPLICATION

This application is based upon and claims the benefit of priority from the prior Japanese Patent Application No. 2016-101769, filed May 20, 2016, the entire contents of which are incorporated herein by reference.

BACKGROUND OF THE INVENTION

1. Field of the Invention

The present invention relates to a technology for estimating the data volume of a digital book.

2. Description of the Related Art

Conventionally, a technique has been proposed in which pages of a book are turned to be photographed by the camera of a tablet terminal or a smartphone terminal and thereby digitized without being cut. However, when a book is opened and photographed from above in a normal state, character strings and diagrams in an image acquired thereby are distorted due to the curl of the pages of the book. That is, this unprocessed image that has just been captured is not suitable for reading.

Accordingly, a technique has been proposed in which, after image capturing, image data acquired thereby are subjected to digital book creation processing, such as color conversion, shape correction including curvature correction, trapezoidal correction, and rectangular correction, and compression processing by a tablet application so as to be converted into images that are easy to read (for example, Japanese Patent Application Laid-Open (Kokai) Publication No. 2014-140146).

When a captured image data group that has not been subjected to any processing is processed to be a digital book so as to be easy to read, its data volume is increased or decreased (generally decreased). However, this digital book creation processing including image processing such as color correction and shape correction requires a long processing time. In addition, the volume of data subjected to the digital book creation processing varies depending on the characteristics of the page images. Accordingly, a technology has been demanded by which the data volume of a digital book to be created can be estimated.

SUMMARY OF THE INVENTION

In accordance with one aspect of the present invention, there is provided a method for estimating a data volume of a digital book, comprising: clipping an evaluation image from a page image; performing book digitization on the evaluation image; and estimating a data volume of a digital book corresponding to the page image, based on a data volume of the evaluation image subjected to the book digitization.

In accordance with another aspect of the present invention, there is provided an apparatus for estimating a data volume of a digital book, comprising: a clipper which clips an evaluation image from a page image; a book digitizer which performs book digitization on the evaluation image clipped by the clipper; and an estimator which estimates a data volume of a digital hook corresponding to the page image, based on a data volume of the evaluation image subjected to the book digitization by the book digitizer.

In accordance with another aspect of the present invention, there is provided a non-transitory computer-readable storage medium having stored thereon a program that is executable by a computer to actualize functions comprising: clipping an evaluation image from a page image; performing book digitization on the evaluation image; and estimating a data volume of a digital book corresponding to the page image, based on a data volume of the evaluation image subjected to the book digitization.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

DETAILED DESCRIPTION OF THE PREFERRED EMBODIMENTS

A. First Embodiment

Figure 1:
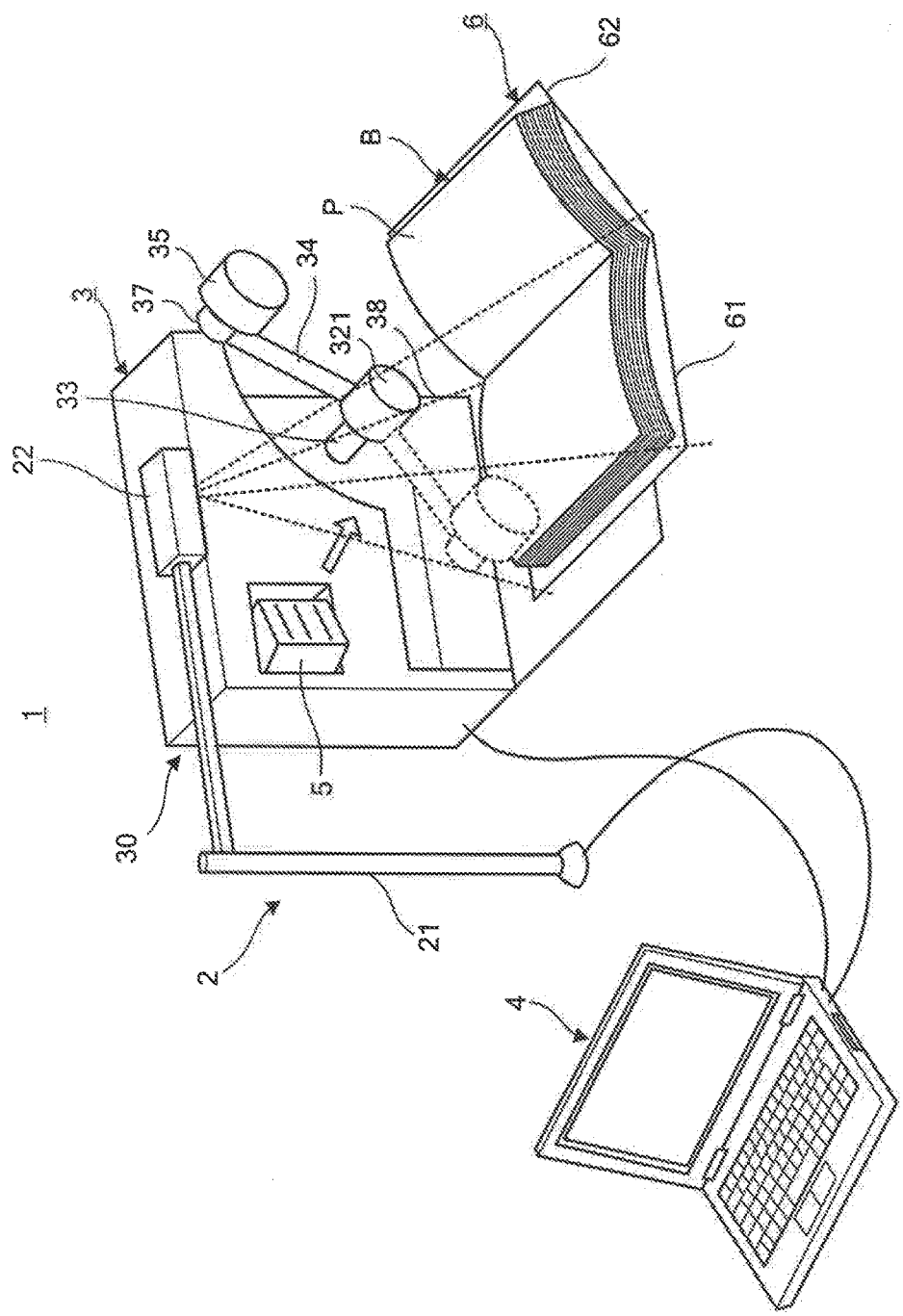
FIG. 1 is a perspective view showing a schematic structure of an example of a document camera system 1 according to an embodiment.

An embodiment of the present invention will hereinafter be described with reference to the accompanying drawings Note that, although the embodiment described below is provided with various technically preferable limitations in order to carry out the present invention, these limitations are not intended to limit the scope of the present invention to the embodiment and examples shown in the drawings.

FIG. 1 is a perspective view showing a schematic structure of an example of a document camera system 1 according to the embodiment. Note that in the following descriptions a case is exemplarily described in which pages P of a book B are turned from left to right. This document camera system 1 includes a document camera 2 which serves as imaging means for photographing pages P of the book B, a page turning apparatus 3 which turns pages P of the book B, and a personal computer 4 which is connected to the document camera 2 and the page turning apparatus 3 such that it can communicate with them, as shown in FIG. 1.

The document camera 2 is provided with a stand section 21 and a camera 22 attached to the upper end of the stand section 21. The stand section 21 is tiltable in the front-and-back direction and the right-and-left direction and is vertically extendable so that the relative positional relationship between the book B and the camera 22 can be adjusted. The lens of the camera 22 is oriented downward so that the book B is within the viewing angle of the lens. In the joint portion between the camera 22 and the stand section 21, a positioning mechanism is provided, whereby the orientation of the lens of the camera 22 can be adjusted.

The page turning apparatus 3 includes a holding table 6 which holds the opened book B, and a page turning apparatus body 30 which holds pages P of the book B on the holding table 6 at a page-turning start point and releases each page P at a page-turning end point The holding table 6 includes a pair of holding plates 61 and 62 which is foldable by a hinge not shown. In this embodiment, in the case where pages P of the book B are turned from left to right, one holding plate 61 of the pair of holding plates 61 and 62 which is located on the left side is placed along the surface of a table, and the other holding plate 62 located on the right side is placed obliquely upward on the table at a predetermined tilt angle with respect to the holding plate 61. On the holding plate 61, pages P that serve as a page-turning start point of the book B are placed. On the other holding plate 62, pages P that serve as a page-turning end point of the book B are placed.

Accordingly, the holding table 6 holds the book B such that pages P at a page-turning end point tilt in a direction to rise with the seam of the book B as an axis, as compared to pages P at a page-turning start point. Note that, since the pair of holding plates 61 and 62 is foldable by the hinge, an angle between the pair of holding plates 61 and 62 can be adjusted, and a tilt angle with respect to the horizontal plane of a page P at a page-turning end point can be freely adjusted.

The page turning apparatus body 30 includes an arm section 34 which swings around a driving shaft 33, a sticking section 35 which is attached to a distal end of the arm section 34 and sticks to a page P of the book B, a pedestal section 38 which supports the driving shaft 33, the arm section 34, and the sticking section 35, an air blowing section 5 which blows air against a page P at a page-turning end point by making air pass above a page P at a page-turning start point, and a control section not shown which controls the respective sections.

As shown in FIG. 1, a rotating body 321 is attached to a distal end portion of the driving shaft 33, and the arm section 34 is attached to the rotating body 321 in a manner to extend along a horizontal plane perpendicular to the driving shaft 33. The arm section 34 is, for example, a rectangular plate-like member made of resin, and a sectional portion of the arm section 34 which is perpendicular to the longitudinal direction has a flat plate-like shape. The sticking section 35 is attached to a distal end of the arm section 34 through a driving section 37 such as a motor. This sticking section 35 is an adhesive section having a substantially columnar shape.

Figure 2:
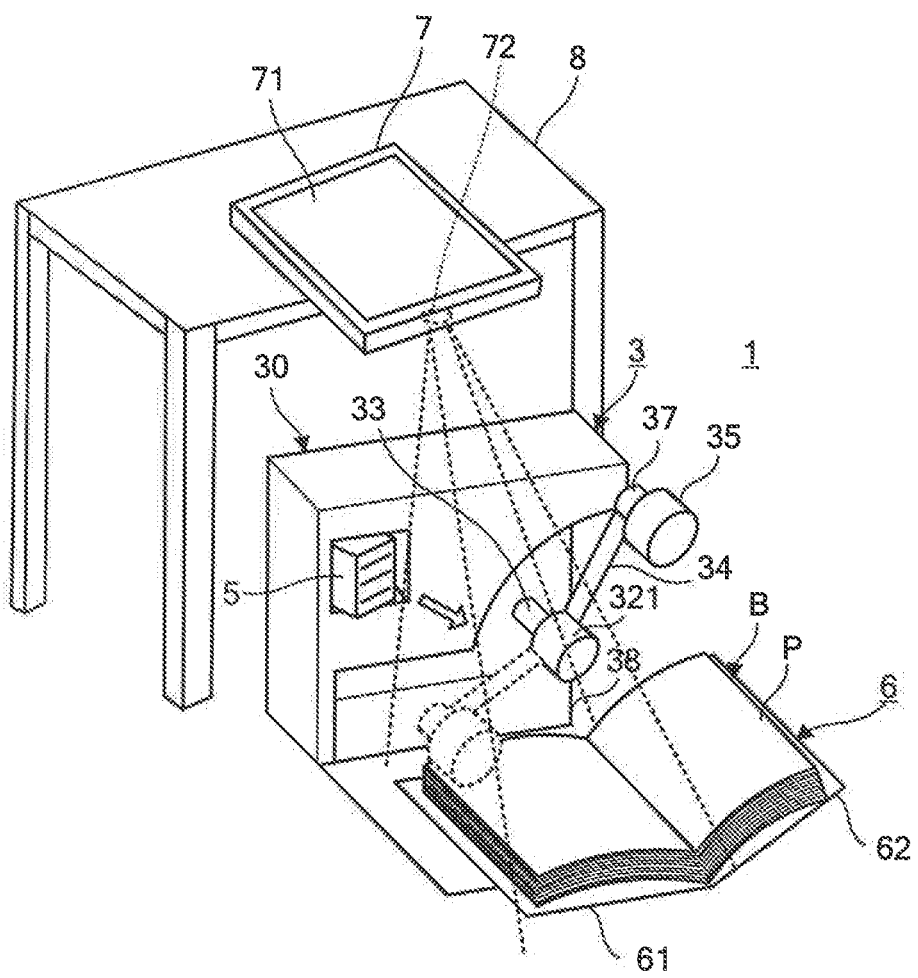
FIG. 2 is a perspective view showing a schematic structure of another example of the document camera system 1 according to the embodiment.

FIG. 2 is a perspective view showing a schematic structure of another example of the document camera system 1 according to the embodiment. Note that sections corresponding to those in FIG. 1 are provided with the same reference numerals, and descriptions thereof are omitted. The only difference between the document camera system 1 in FIG. 2 and that in FIG. 1 is that the document camera system 1 in FIG. 2 does not include the document camera 2 and the personal computer 4 which is connected to and can communicate with the document camera 2 and the page turning apparatus 3, and the page turning apparatus 3 itself is the same as that in FIG. 1. In the document camera system 1 in FIG. 2, a smartphone, a tablet terminal, or the like (hereinafter referred to as an information processing terminal 7) equipped with a camera section is used in place of the document camera 2 and the personal computer 4. The information processing terminal 7 is arranged on a placement table 8 such as a table having a flat surface at a suitable height. This information processing terminal 7 is placed face down such that its display section 71 is oriented upward and its imaging section is oriented downward so that the book B is within the viewing angle. The imaging section 72 is in the upper center or upper corner (right corner when viewed from the display section 71 side) of the information processing terminal 7.

In both of the structures of FIG. 1 and FIG. 2, in a page turning operation, the arm section 34 is first moved to the page-turning start point side where pages P on the holding plate 61 side are located, so that the sticking section 35 sticks to a page P at a page-turning start point. Then, the arm section 34 is moved to a page-turning end point on the holding plate 62 side with the sticking section 35 sticking to the page P. As a result this page P is moved to the page-turning end point along with the forward movement of the arm section 34, and then comes unstuck at this page-turning end point. Here, at predetermined timing, a page P on the holding plate 61 side which has not yet been turned over is photographed by the imaging section 72 of the camera 22 or the information processing terminal 7. Then, the arm section 34 is moved in a direction opposite to that of the forward movement toward the page-turning start point side on the holding plate 61 side, so that the sticking section 35 sticks to this new page P (photographed page) on the page-turning start point side. By this reciprocation operation being repeated, page turning operations for the pages P are progressed.

Here, until a last page P is reached, all the pages P (such as odd-numbered pages) on one side of the book B are photographed. Image data acquired thereby are numbered for each page P (each imaging operation), transmitted to a CPU (Central Processing Unit) 77 (which is described later) of the personal computer 4 or the information processing terminal 7, and stored in a predetermined storage section or the like. Then, the user inverts the book B, places it on the holding table 6, and causes the above-described page turning operations to be performed again. As a result, until a last page P is reached, all pages P (such as even-numbered pages) on the other side of the book B are photographed. Then, as described above, image data acquired thereby are numbered for each page P (each imaging operation), transmitted to the CPU 77 (which is described later) of the personal computer 4 or the information processing terminal 7, and stored in the predetermined storage section or the like. Then, the images of the odd-numbered pages P and the even-numbered pages P are alternately rearranged in page order so as to be compiled as scan images of all the pages P.

At this stage, the color tones of these image data of the pages P are different for each page P. In addition, the entire area of each page P, or images, character strings, and diagrams on each page P are distorted due to the curl and the like of the pages P of the book B. Accordingly, in the personal computer 4 or the information processing terminal 7, color correction, shape correction (curvature correction, trapezoidal correction, or rectangular correction), and file format conversion (such as conversion to the PDF (Portable Document Format) format including compression) are performed on the page images.

In this embodiment, prior to the digitization of the entire book B, image data of a predetermined number of pages (for example, five pages) (hereinafter referred to as a page image group) are randomly selected from scan images of all the pages P, and the data volume (file size) of a resultant digital book to be created from the entire book B is estimated based on each of the page images selected as the page image group. More specifically, first, a predetermined area (evaluation area: for example, a center area having a predetermined size) is clipped from each of the selected page images. Subsequently, the clipped image is subjected to color correction and compressed at a compression rate based on an image quality specified via a user interface (an image quality after book digitization). Then, the data volume of the clipped image is derived.

Note that the above-described image to be clipped (evaluation image) is not limited to an image of a center area having a predetermined size. It may be an image determined based on a difference between a data volume estimated in the past by the data volume estimation processing described below and the data volume of a book actually digitized at the time (which are acquired from history information), or may be an image determined based on an area ratio between a character area and a background area constituting a page image. Also, it may be an image of an area substantially equal to 10 to 40 percent of a page image.

In particular, in the configuration where the image to be clipped is determined based on a difference between a data volume estimated in the past by data volume estimation processing and the data volume of a book actually digitized at the time (which are acquired from history information), when the difference is large, the clipping size is set to be large because it means that the estimation accuracy is low. When the difference is small, the clipping size is set to be small because it means that the estimation accuracy is high. Here, if the clipping size is small, the processing load is decreased (because the processing time is shortened), whereby the number of page images to be selected as a page image group can be increased and the estimation accuracy can be increased.

Next, the data volume of the page image per pixel is derived based on the number of the pixels of the clipped image and the data volume of the clipped image. In addition, based on the data volume per pixel and an image size specified via the user interface, an estimated data volume for this one page is derived. Next, by use of each estimated data volume for one page acquired for the selected image data of the predetermined number of pages, the average thereof is derived. Then, a final estimated data volume of the entire book B is derived using the average estimated data volume and the number of the total pages of the book B.

In particular, in the present embodiment an image quality and an image size that serve as parameters for determining the above-described final estimated data volume of the entire book B can be inputted via the user interface. Every time an inputted image quality and/or an inputted image size are changed, data volume estimation processing for determining a final estimated data volume of the entire book B is performed based on each page image of a randomly selected page image group, and the derived estimated data volume of the entire book B is shown (displayed) on the user interface.

As such, in this embodiment, image data of a predetermined number of pages are randomly selected, and the data volume of a resultant digital book to be created from the entire book B is estimated in a short time based on a predetermined area (evaluation area; for example, a center area) in each of the page images selected as a page image group. Also, in this embodiment, the user can adjust a final image quality and a final image size while checking an estimated data volume via the user interface. This configuration improves the user-friendliness.

Note that in the descriptions below, the information processing terminal 7, which is a smartphone, a tablet terminal, or the like, is used as a device for performing image processing such as curvature correction, trapezoidal correction, and rectangular correction. However, by use of a similar software program (application program), the same processing can be achieved by the personal computer 4 although its hardware configuration is different therefrom.

Figure 3:
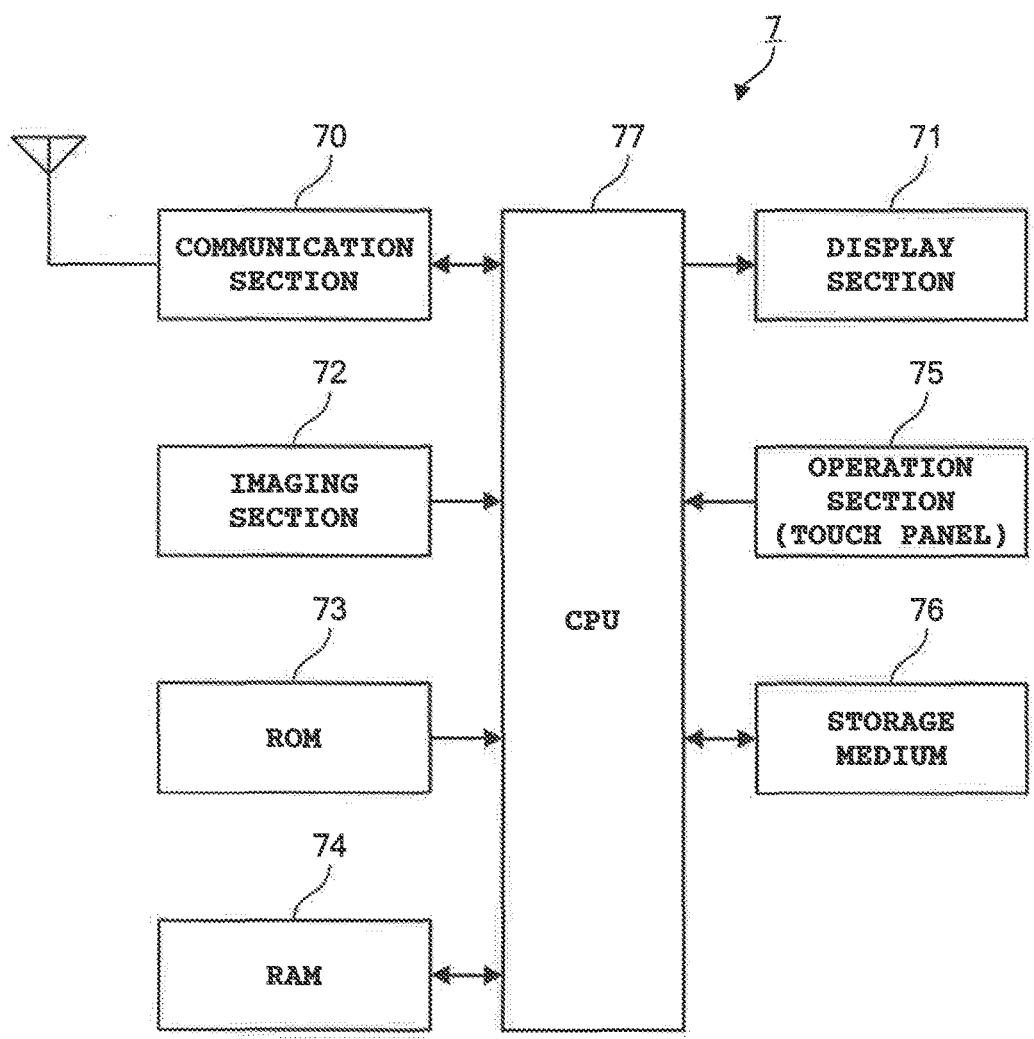
FIG. 3 is a block diagram showing a schematic structure of an information processing terminal 7 according to the embodiment.

FIG. 3 is a block diagram showing a schematic structure of the information processing terminal 7 according to the present embodiment. The information processing terminal 7 in FIG. 3 includes a communication section 70, a display section 71, an imaging section 72, a ROM (Read-Only Memory) 73, a RAM (Random Access Memory) 74, an operation section (touch panel) 75, a storage medium 76, and the CPU 77 (which serves as a clipper, a book digitizer, and an estimator). The communication section 70 connects the information processing terminal 7 to a network such as the Internet by using mobile communication, Bluetooth (registered trademark), wireless LAN (Wi-Fi (Wireless Fidelity)), or the like. The imaging section 72 includes a lens block constituted by an optical lens group and an image sensor such as a CCD (Charge-Coupled Device) or a CMOS (Complementary Metal Oxide Semiconductor), and captures images entering from the lens block by the image sensor. In particular, in the present embodiment, the imaging section 72 photographs pages P of the book 13. Note that the CPU may be a processor or the like.

The ROM 73 stores programs to be executed by the CPU 77 described later, various parameters required for operations, and the like. The RAM 74 stores data, such as temporary data when a program is executed by the CPU 77, various application programs, various parameters required for the execution of the application programs. In particular, in this embodiment, the RAM 74 stores captured image data, clipped images for data volume estimation processing, compressed images, and the like.

The display section 71 is constituted by a liquid crystal display, an organic EL (Electro Luminescence) display, etc., and displays icons associated with specific functions and application programs, application screens, various menu screens, and the like. The operation section (touch panel) 75 is provided by being laminated on the screen of the display section 71 and detects direct contact by a finger or a stylus (pen) or the approach thereof. Note that the operation section (touch panel) 75 may include mechanical switches, such as a power button and a sound-volume button.

In particular, in the present embodiment, the display section 71 displays the user interface for specifying, via the operation section (touch panel) 75, the image quality and the image size of image data (PDF file) to be finally acquired and presenting (displaying) an estimated data volume of the image data, in data volume estimation processing.

The storage medium 76 stores various data, such as captured image data. The CPU 77 controls the operations of each section by executing the programs stored in the above-described ROM 73. In particular, in the present embodiment the CPU 77 causes pages P of the book B to be photographed in synchronization with page turning operations on the pages P, causes captured image data acquired thereby to be edited, estimates the data volume of a resultant digital book to be created prior to digital book creation processing using the captured image data, and converts the captured image data to a PDF file by performing color correction, shape correction (rectangular correction, trapezoidal correction, curvature correction), and compression.

Figure 4:
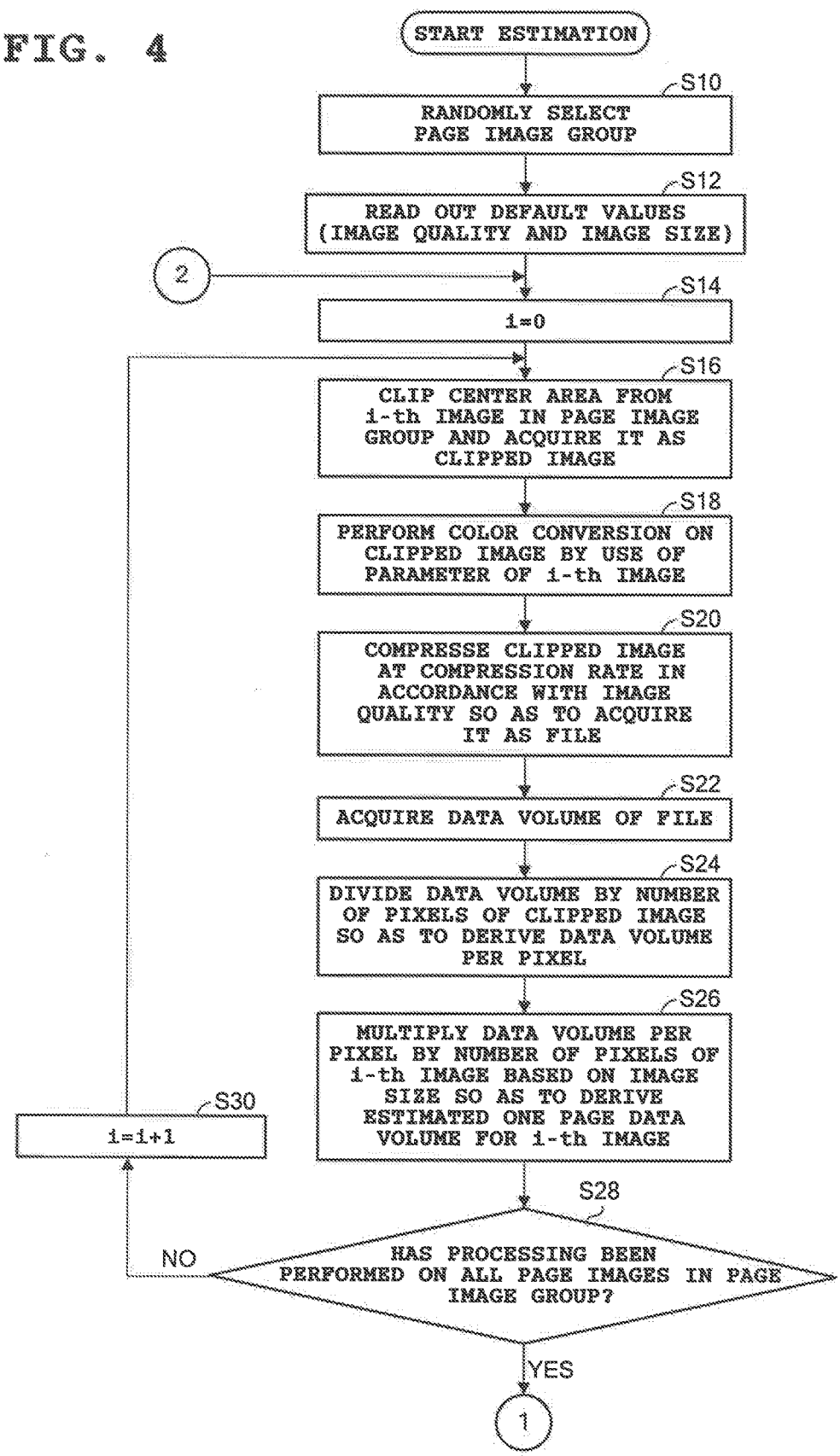
FIG. 4 is a flowchart for describing data volume estimation processing in the information processing terminal 7 according to the embodiment.
Figure 5:
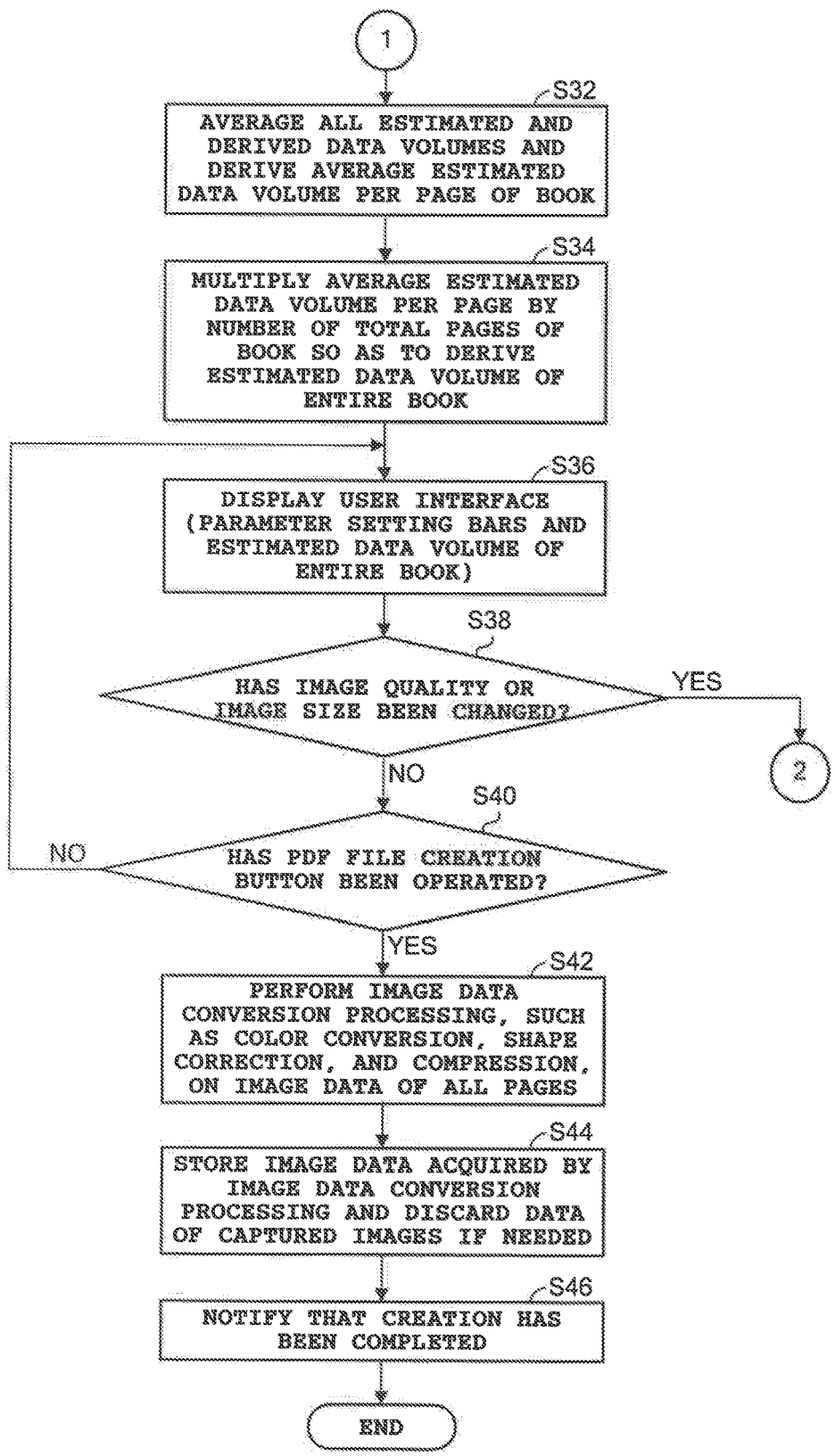
FIG. 5 is also a flowchart for describing the data volume estimation processing in the information processing terminal 7 according to the embodiment.

FIG. 4 and FIG. 5 are flowcharts for describing data volume estimation processing in the information processing terminal 7 according to the present embodiment. Note that, in the information processing terminal 7 herein, page images of all the pages of the book B have already been stored in the storage medium 76 or the like in page order as image data in a predetermined format. As a series of operations after the photographing of the pages of the book B, the information processing terminal 7 performs data volume estimation processing.

First, the CPU 77 randomly selects a page image group from among the page images of the book B in the storage medium 76 (Step S10). Note that, although five page images have been selected herein as the page image group, the number thereof may be changed as needed based on the number of the pages of the entire book or the processing capacity of the CPU 77. That is, the length of time required to estimate the volume of the book becomes longer if the number of the selected page images is larger. Therefore, the number of page images to be selected should preferably be determined taking the processing time into consideration.

Next, the CPU 77 reads out default values for an image quality and an image size which are used in this book volume estimation processing (Step S12). Note that these default values may be values set in advance or may be values used in the preceding book volume estimation processing. Next, the CPU 77 resets variable i for counting the pages of a processing target to 0 (Step S14).

Next the CPU 77 clips a center area from the i-th image in the selected page image group, and acquires this area as a clipped image (Step S16). Subsequently, the CPU 77 performs color conversion on the clipped image by use of a parameter of the i-th image (Step S18), compresses the clipped image subjected to the color conversion at a compression rate in accordance with the image quality so as to acquire it as a file (Step S20), and acquires the data volume of this file (Step S22).

Next, the CPU 77 divides the data volume by the number of the pixels of the clipped image so as to derive a data volume per pixel (Step S24), and multiplies the data volume per pixel by the number of the pixels of the i-th image based on the original image size for one page so as to derive, for the i-th image, an estimated data volume for one page (Step S26).

Next, the CPU 77 judges whether this processing (estimation) has been performed on all the page images in the page image group (Step S28). When judged that there are still unprocessed page images (NO at Step S28), the CPU 77 increments variable i by one (Step S30), and returns to Step S16. Then, the CPU 77 performs the above-described processing of Step 16 to Step 26 on the next page image in accordance with variable so as to derive, for this image, an estimated data volume for one page. Hereafter, the CPU 77 derives an estimated data volume for each of the remaining page images in the same manner.

Then, when judged that the processing (estimation) has been performed on all the page images in the page image group (YES at Step S28), the CPU 77 averages the estimated data volumes derived thereby, and derives an average estimated data volume per page of the book (Step S32). Subsequently, the CPU 77 multiplies the average estimated data volume per page by the number of the total pages of the book so as to derive an estimated data volume of the entire book (Step S34).

Next, the CPU 77 displays the above-described user interface for providing parameter setting bars for setting an image quality and an image size, and the estimated data volume of the entire book (Step S36).

Figure 6:
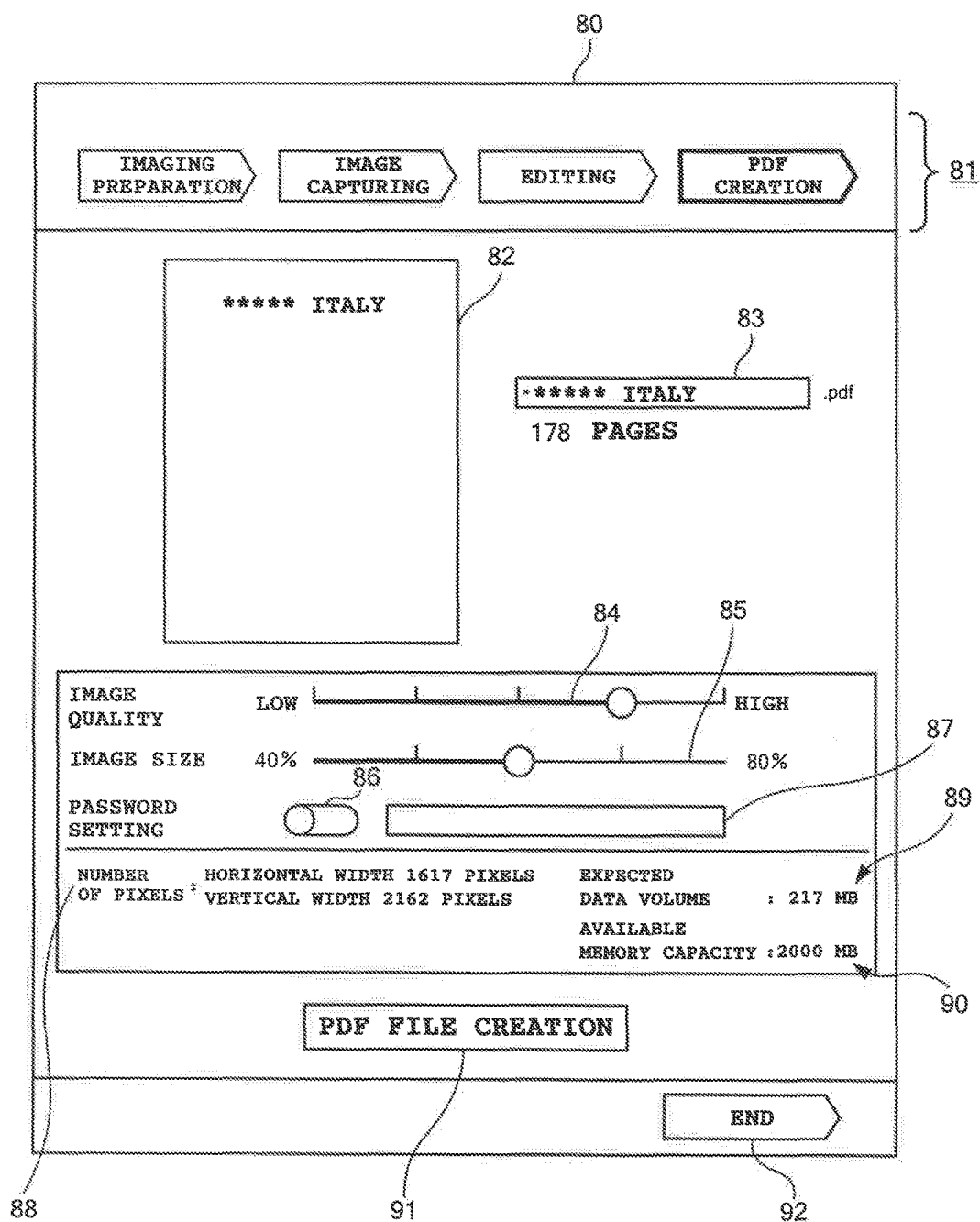
FIG. 6 is a conceptual diagram for describing an example of a user interface according to the embodiment.

FIG. 6 is a conceptual diagram for describing an example of the user interface according to the present embodiment. In the upper area of this user interface 80, tags (imaging preparation, image capturing, editing, and PDF creation) 81 indicating currently performed processing are displayed. Here, the tags 81 indicate that PDF creation is currently being performed. In an area under the tags 81, an image 82 of the front cover of a book and a name (editable) 83 of a file to be created is displayed.

Also, under this area, a parameter setting bar 84 for setting an image quality, a parameter setting bar 85 for setting an image size, a slide switch 86 for setting a password, a password input box 87, the number of the pixels 88 (horizontal and vertical widths) of the book, an expected data volume 89 indicating an estimated data volume of the entire book, and an available memory capacity 90 are displayed. In addition, under this area, a PDF file creation button 91 for instructing to create a PDF file is displayed. In the lowermost area, a completion instruction button 92 for instructing to complete current data volume estimation processing is displayed.

From the expected data volume 89 displayed on the user interface 80 in FIG. 6, the user can check the data volume of a PDF file to be finally created. Also, from the shown available memory capacity 90, the user can check the available memory capacity of the information processing terminal 7. Moreover, the user can check an image quality and an image size set for this data volume estimation from the position of the operator portion of the parameter setting bar 84 and the position of the operator portion of the parameter setting bar 85, respectively.

When wishing to change the data volume of the PDF file to be finally created, the user can adjust (instruct to adjust) its image quality by sliding the operator of the parameter setting bar 84 in the left or right direction, or can adjust its image size by sliding the operator of the parameter setting bar 85 in the right or left direction.

Also, by entering an arbitrary password into the password input box 87 and sliding the slide switch 86 for password setting so as to turn it on, the user can set a password for the PDF file to be created.

Returning to FIG. 5, the CPU 77 judges whether or not an image quality has been changed using the operator of the parameter setting bar 84 in the user interface 80, and judges whether or not an image size has been changed using the operator of the parameter setting bar 85 (Step S38). When judged that the image quality and the image size have not been changed in the user interface 80 (NO at Step S38), the CPU 77 judges whether the PDF file creation button 91 for instructing to create a PDF file has been operated (touched) (Step S40). Then, when judged that the PDF file creation button 91 has not been operated (touched) (NO at Step S40), the CPU 77 returns to Step S36, and continues the display of the user interface 80.

At Step S38, when judged that the image quality and/or the image size have been changed in the user interface 80 (YES at Step S38), the CPU 77 returns to the above-described Step S14, derives an average estimated data volume for each page image of the selected page image group in accordance with the newly inputted image quality and/or image size, derives an estimated data volume of the entire book by use of these average estimated data volumes, and displays it on the user interface 80 shown in FIG. 6.

Hereafter, every time the user changes an image quality and/or an image size via the user interface 80, the CPU 77 derives an estimated data volume of the entire book in real time in accordance with the changed image quality and/or image size, and displays it on the user interface 80.

At Step S40, when judged that the PDF file creation button 91 for instructing to create a PDF file has been operated (touched) in the user interface 80 (YES at Step S40), the CPU 77 performs image data conversion processing, such as color conversion and shape correction (rectangular correction, trapezoidal correction, and curvature correction) on the image data of all the pages and conversion (including compression) to a PDF file, in accordance with the image quality and the image size specified via the user interface 80 (Step S42). Subsequently, the CPU 77 stores the image data (PDF file) acquired by the image data conversion processing, discards the data of the captured images if needed (Step S44), and notifies that the creation of the PDF file has been completed (Step S46). Then, the CPU 77 ends the data volume estimation processing.

Figure 7:
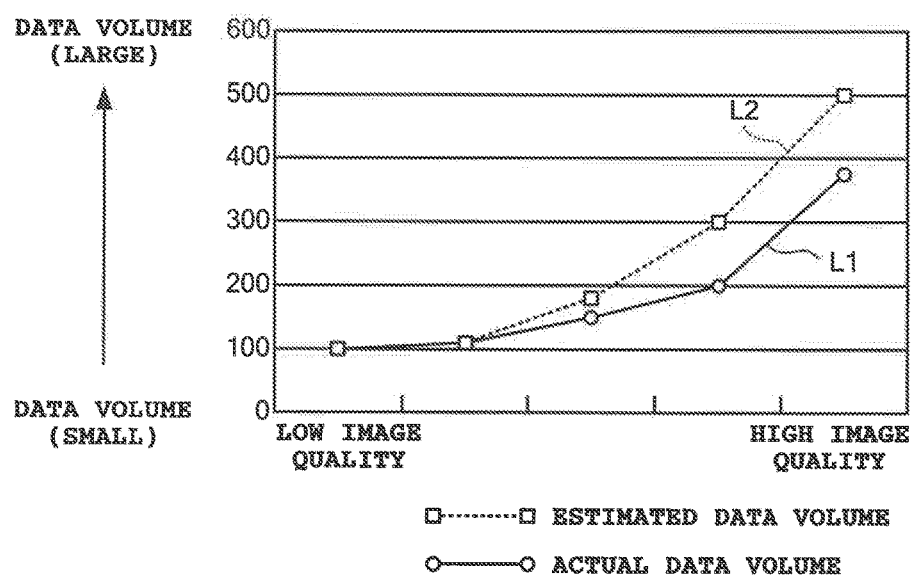
FIG. 7 is a conceptual diagram showing a result of the data volume estimation processing in the information processing terminal 7 according to the embodiment.

FIG. 7 is a conceptual diagram showing a result of the data volume estimation processing in the information processing terminal 7 according to the embodiment. The horizontal axis in FIG. 7 indicates an image quality and the vertical axis indicates the volume of a PDF file that is finally acquired. Also, line segment L1 indicates actual data volumes, and line segment L2 indicates estimated data volumes of an entire book derived by the above-described data volume estimation processing. As shown in the drawing, the difference therebetween is larger when the image quality is higher. However, even when the image quality is high, the error can be suppressed to about 100 M bytes According to the above-described embodiment, an image of a center area (evaluation area) is clipped from a page image, and this clipped image is subjected to digital book creation processing (color correction, compression). Then, based on the data volume of the clipped image after the digital book creation processing, the data volume of a digital book corresponding to the page image is estimated. As a result of this configuration, the data volume of a digital book corresponding to a page image can be estimated in a short time.

Also, according to the above-described embodiment, a predetermined number of page images are selected from a plurality of page images, and images clipped from the selected page images are subjected to digital book creation processing (color correction, compression). Subsequently, based on the data volumes of the clipped images after the digital book creation processing, the data volume of a digital book corresponding to each page image is estimated. Then, based on the data volume of a digital book corresponding to each page image, the data volume of a digital book corresponding to the entire book is estimated. As a result of this configuration, the data volume of a digital book corresponding to an entire book can be estimated in a short time.

Moreover, the above-described clipped image in the present embodiment is an image of a center area having a predetermined size, an image of a size determined based on a difference between an estimated data volume of a digital book and an actual data volume after the book digitization, an image of a size determined based on an area ratio between a character area and a background area constituting an image, or an image of an area substantially equal to 10 to 40 percent of a page image. As a result of this configuration, the data volume of a digital book can be estimated with high accuracy.

Furthermore, according to the above-described embodiment in the estimation of the data volume of a digital book, image conversion is performed on a clipped image based on a conversion parameter, and the converted image is compressed at a predetermined compression ratio. As a result of this configuration, a data volume of a digital book which is close to the actual data volume can be acquired.

Still further, according to the above-described embodiment, in the estimation of the data volume of a digital book, color correction is performed. As a result of this configuration, a data volume of a digital book which is close to the actual data volume can be acquired.

Yet still further, according to the above-described embodiment, a predetermined compression ratio can be specified via the user interface 80. As a result of this configuration, the user can adjust a final image quality while checking an estimated data volume via the user interface. That is, this configuration improves the user-friendliness.

Yet still further, according to the above-described embodiment, the data volume of a page image is estimated based on its data volume per pixel and the image size of a digital book to be created. As a result of this configuration, a data volume of a digital book which is close to the actual data volume can be acquired.

Yet still further, according to the above-described embodiment, the image size of a digital book to be created can be specified via the user interface 80. As a result of this configuration, the user can adjust a final image quality while checking an estimated data volume via the user interface. That is, this configuration improves the user-friendliness.

While the present invention has been described with reference to the preferred embodiments, it is intended that the invention be not limited by any of the details of the description therein but includes all the embodiments which fall within the scope of the appended claims.

What is claimed is:

1. A method for estimating a data volume of a digital book, the method comprising:
   clipping an evaluation image from a page image;
   performing book digitization on the evaluation image; and
   estimating a data volume of a digital book corresponding to the page image, based on a data volume of the evaluation image subjected to the book digitization,
   wherein the evaluation image has a size determined based on a difference between (i) an estimated data volume of another digital book acquired in the past and (ii) an actual data volume of the another digital book.

2. The method according to claim 1, further comprising:
   selecting a predetermined number of page images from among a plurality of page images;
   deriving a data volume per page image from data volumes of evaluation images which are respectively clipped from the predetermined number of page images and then subjected to book digitization; and
   estimating a data volume of a digital book corresponding to the plurality of page images based on the data volume per page image.

3. The method according to claim 1, wherein the evaluation image is an image clipped from a center area of the page image.

4. The method according to claim 1, wherein the evaluation image has an area equal to 10 to 40 percent of the page image.

5. The method according to claim 1, wherein the book digitization includes:
   performing image conversion on a target image based on a conversion parameter; and compressing the converted image at a predetermined compression ratio.

6. The method according to claim 5, wherein the conversion parameter is a color correction parameter set on the page image in advance.

7. The method according to claim 5, wherein the compression ratio is specified via a user interface.

8. The method according to claim 1, wherein the estimation of the data volume of the digital book corresponding to the page image is performed based on an image size of the digital book corresponding to the page image and a data volume per pixel of the evaluation image subjected to the book digitization.

9. The method according to claim 8, wherein the image size is specified via a user interface.

10. An apparatus for estimating a data volume of a digital book, the apparatus comprising:
a processor which actualizes functions comprising:
clipping an evaluation image from a page image;
performing book digitization on the evaluation image; and
estimating a data volume of a digital book corresponding to the page image, based on a data volume of the evaluation image subjected to the book digitization; and
a storage which stores data subjected to the book digitization,
wherein the evaluation image has a size determined based on a difference between (i) an estimated data volume of another digital book acquired in the past and (ii) an actual data volume of the another digital book.

11. A non-transitory computer-readable storage medium having stored thereon a program that is executable by a computer to actualize functions comprising:
clipping an evaluation image from a page image;
performing book digitization on the evaluation image; and
estimating a data volume of a digital book corresponding to the page image, based on a data volume of the evaluation image subjected to the book digitization,
wherein the evaluation image has a size determined based on a difference between (i) an estimated data volume of another digital book acquired in the past and (ii) an actual data volume of the another digital book.

12. A method for estimating a data volume of a digital book, the method comprising:
clipping an evaluation image from a page image;
performing book digitization on the evaluation image; and
estimating a data volume of a digital book corresponding to the page image, based on a data volume of the evaluation image subjected to the book digitization,
wherein the evaluation image has a size determined based on an area ratio between a character area and a background area constituting the page image.

13. An apparatus for estimating a data volume of a digital book, the apparatus comprising:
a processor which actualizes functions comprising:
clipping an evaluation image from a page image;
performing book digitization on the evaluation image; and
estimating a data volume of a digital book corresponding to the page image, based on a data volume of the evaluation image subjected to the book digitization; and
a storage which stores data subjected to the book digitization,
wherein the evaluation image has a size determined based on an area ratio between a character area and a background area constituting the page image.

14. A non-transitory computer-readable storage medium having stored thereon a program that is executable by a computer to actualize functions comprising:
clipping an evaluation image from a page image;
performing book digitization on the evaluation image; and
estimating a data volume of a digital book corresponding to the page image, based on a data volume of the evaluation image subjected to the book digitization,
wherein the evaluation image has a size determined based on an area ratio between a character area and a background area constituting the page image.

* * * * *